Feb. 9, 1965  J. W. MORRISSEY  3,168,784

COATING THICKNESS MEASURING DEVICE

Filed Feb. 26, 1962

INVENTOR.
JOSEPH W. MORRISSEY
BY
Clarence R. Batty, Jr.
ATTORNEY

3,168,784
COATING THICKNESS MEASURING DEVICE
Joseph W. Morrissey, Corning, N.Y., assignor to Corning Glass Works, Corning, N.Y., a corporation of New York
Filed Feb. 26, 1962, Ser. No. 175,455
1 Claim. (Cl. 33—172)

This invention relates to apparatus for thickness measurement and more particularly for measurement of the thickness of a coating of finely divided particles disposed upon a unitary base material.

In the manufacture of glazed ceramic articles it is important for many applications that the thickness of the glaze be uniform over the entire under body. This uniformity of thickness of the fired glaze can best be controlled by controlling the thickness of the green ceramic enamel frit and, therefore, it is desirable that a simple and efficient apparatus be available so that the measurement of the green enamel can be rapidly and consistently measured. Apparatus which has heretofore been utilized for measuring the thickness of such enamel layers has required or resulted in the removal of a portion of the unfired enamel slip from the surface of the body being coated. This has required that the coating subsequently be reapplied to that portion from which it has been removed before the body is subjected to a firing operation to mature the glaze.

The principal object of this invention is to provide apparatus which can be utilized to measure the thickness of a particulate coating on a dense substrate without destroying a portion of such coating, and in particular, an apparatus for measuring the thickness of a green enamel coating on a ceramic substrate.

Other objects and advantages of the invention will appear from the following description and claim in conjunction with the accompanying drawings which show preferred embodiments of the invention and in which:

Figure 1:
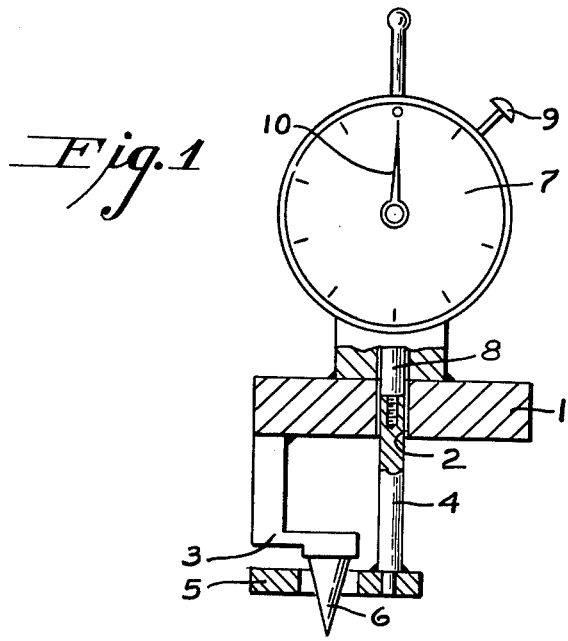
FIG. 1 is a front elevation partially in section, of a thickness measuring device in accordance with this invention.

As illustrated in the drawings, the thickness measuring device comprises a base portion 1 having an aperture 2 extending through said base, a stylus 3 in fixed relationship with said base 1. A rod 4 is positioned so that at least a portion thereof extends into the aperture 2 of the base, said rod having at its lower end a collar 5 which surrounds or encircles the point 6 of the stylus 3. A suitable measuring device, such as dial gage 7 is affixed to the base 1 in such manner that the measuring rod 8 extends into aperture 2 so that the gauge records relative movement of the collar 5 with respect to the stylus 3. The gauge has means associated therewith for adjusting the gauge to the proper "zero point," such as adjustment screw 9.

size, so long as the bottom surface thereof is flat, to measure the coating thickness on flat plates, the outside diameter of the collar should be limited to ⅛-inch when it is desired to measure the coating on a surface which has a radius of curvature of about one inch or even more.

Before a desired measurement is made, the device is adjusted by placing the stylus point 6 on a flat, hard surface and the collar 5 is also placed in contact with said surface. The adjustment screw 9 of the dial gauge is then turned so that the needle 10 of the gauge is set at the zero position when the measuring bar 8 of the gauge is firmly in contact with the rod 4 at the end thereof opposite to that which contains the collar 5.

When the thickness measuring device of this invention is properly adjusted as set forth hereinabove, the thickness of a particulate coating can be readily determined by placing the measuring device on the surface of the coated body in such manner that the point of the stylus penetrates the coating to the upper surface of the dense substrate; the coating preventing the collar from remaining in fixed relationship to the point of the stylus and, therefore, imparting a relative displacement between the collar and the stylus, such displacement being measured by the dial measuring gauge.

Figure 2:
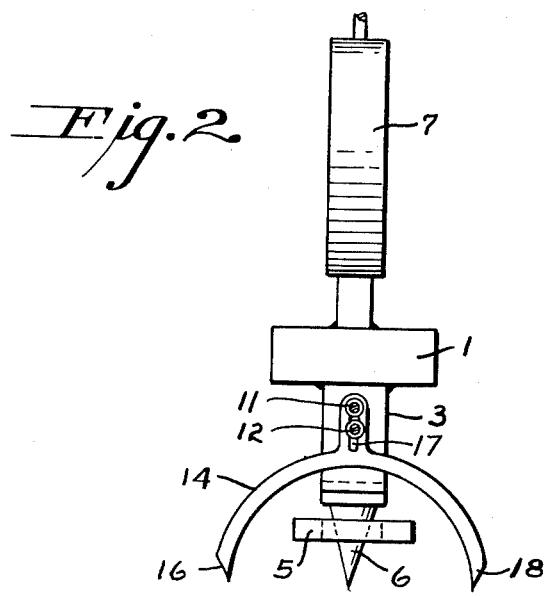
FIG. 2 is a side elevation of a preferred form of such device.

When the above-described measuring device can be utilized to determine the thickness of the particulate coating by a skilled craftsman who can accurately maintain the device substantially perpendicular to the plane of the surface of the coated body, I have found that the accuracy of measuring the coating on a flat portion of a surface of a coated body can be substantially improved by a modification of the above described measuring device. Thus, in FIG. 2 is shown the aforementioned device having affixed to the stylus 3 thereof leveling means 14 comprising two additional fixed contact points 16 and 18. The leveling means 14 is affixed to the stylus 3 by means of two screws, 11 and 12, which pass through slot 17 in said leveling means. Thus, the two fixed points, 16 and 18, are so affixed to the stylus 3 that their position may be readily adjusted so that the plane described by points 6, 16 and 18, is perpendicular to the aperture 2 in said base 1 and therefore, perpendicular to the travel of the rod 4.

What is claimed is:

Apparatus for measuring the thickness of a particulate coating on a dense substrate comprising a base having an aperture extending therethrough, a stylus in fixed relationship to said base and projecting therefrom, a rod extending at least partially through the aperture in said base and having at its lower end a collar surrounding the point of said stylus and means affixed to said base to measure the movement of said rod relative to said base as the collar is displaced relative to the stylus.

References Cited in the file of this patent
UNITED STATES PATENTS

| | | |
|---|---|---|
| 2,164,339 | Morgan | July 4, 1939 |
| 2,664,640 | Euverard | Jan. 5, 1954 |

FOREIGN PATENTS

| | | |
|---|---|---|
| 817,631 | Great Britain | Aug. 6, 1959 |